No. 784,095. PATENTED MAR. 7, 1905.
A. J. ALLISON.
RAKE.
APPLICATION FILED SEPT. 15, 1903.

Witnesses
Inventor,
Arthur J Allison
by C D Lewis
Attorney.

No. 784,095. Patented March 7, 1905.

UNITED STATES PATENT OFFICE.

ARTHUR JONES ALLISON, OF EAST LIVERPOOL, OHIO.

RAKE.

SPECIFICATION forming part of Letters Patent No. 784,095, dated March 7, 1905.

Application filed September 15, 1903. Serial No. 173,301.

*To all whom it may concern:*

Be it known that I, ARTHUR JONES ALLISON, a citizen of the United States, residing at East Liverpool, in the county of Columbiana and State of Ohio, have invented a new and useful Improvement in Rakes, of which improvement the following is a specification.

My invention relates to rakes; and its object is to provide a new and improved form of rake in which the height of teeth above the ground may be varied at will.

My invention consists of certain novel forms of details and combination of parts hereinafter fully described and claimed.

Figure 1:
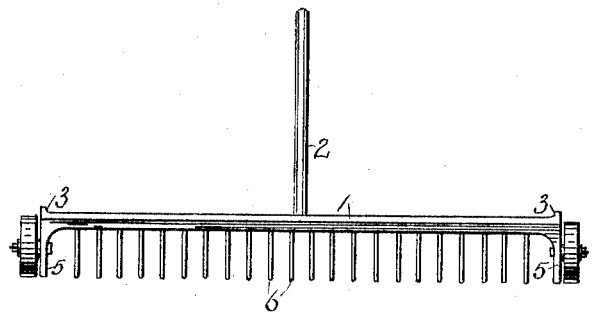
Figure 2:
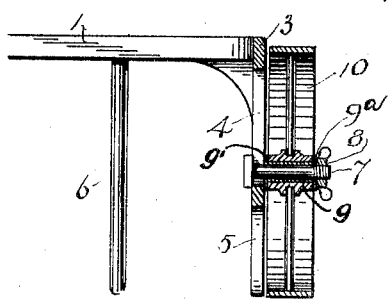
Figure 3:
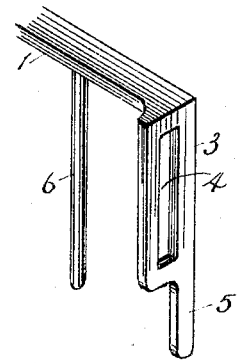
Figure 4:
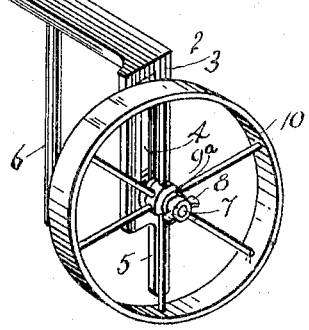
Figure 5:
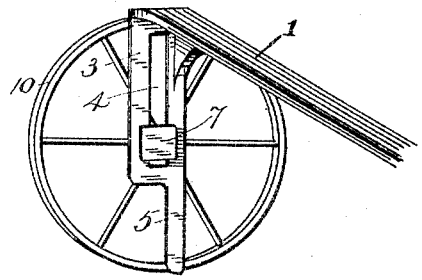

In the accompanying drawings like characters refer to like parts in the several views, and Figure 1 is a view in front elevation of my device complete. Fig. 2 is a partial section through one end thereof, showing my means of adjustment. Fig. 3 is a perspective of one end with the wheel removed. Fig. 4 is a similar view with the wheel on. Fig. 5 is a view of the same from the inside.

My improvement embodies a head or cross-bar 1, to which the handle 2 is attached in any desired manner, and 6 indicates the teeth.

3 indicates the ends of the rake, which are formed integral with the ends of the bar 1 and are preferably of greater width for their major portions, whereby their forward edges project slightly in advance of the adjacent edge of said bar. The lower portions of these bars are formed into teeth 5, disposed in alinement with the teeth 6, heretofore referred to. The ends 3 are formed with slots 4, through which bolts 7 pass. Each bolt is provided with a sleeve 9, on which the wheel 10 is mounted to rotate, the sleeve being provided on its inner end with a flange 9', adapted to project beyond the edges of the slot 4, and on the outer end of the bolt I mount a washer $9^a$ and a nut 8 for preventing displacement of the wheel.

While I have shown my rake supported by wheels 10, yet it will be obvious that they can be dispensed with, and by forming the ends 3 as specified rigidity is added to the rake-frame. Further, when the rake is used without the wheels the said ends by projecting in advance of the teeth 6 will materially protect the same, as well as the teeth 5.

Having thus described my invention, I claim—

In a rake of the type set forth, a cross-bar having a plurality of teeth secured to its under face, depending ends formed integral with the ends of said bar, said depending ends being for their greater portions of greater width than said cross-bar and projecting in advance thereof, said depending ends being slotted and having their lower portions formed into teeth disposed in alinement with the first-named teeth, bolts projecting through said slots, and wheels mounted for rotation on said bolts.

In testimony whereof I have hereunto signed my name in the presence of two subscribing witnesses.

ARTHUR JONES ALLISON.

In presence of—
DANIEL McLAUR,
S. J. ALLISON.